US012670468B1

(12) United States Patent
Stern et al.

(10) Patent No.: US 12,670,468 B1
(45) Date of Patent: Jun. 30, 2026

(54) PROBABILISTIC INVENTORY ESTIMATION IN GROCERY

(71) Applicant: Afresh Technologies Inc., San Francisco, CA (US)

(72) Inventors: Aaron J. Stern, Berkeley, CA (US); Clement Micol, Brooklyn, NY (US)

(73) Assignee: Afresh Technologies Inc., Oakland, CA (US)

( * ) Notice: Subject to any disclaimer, the term of this patent is extended or adjusted under 35 U.S.C. 154(b) by 102 days.

(21) Appl. No.: 18/406,571

(22) Filed: Jan. 8, 2024

Related U.S. Application Data

(60) Provisional application No. 63/590,232, filed on Oct. 13, 2023.

(51) Int. Cl.
 *G06Q 10/087* (2023.01)
(52) U.S. Cl.
 CPC .................................. *G06Q 10/087* (2013.01)
(58) Field of Classification Search
 CPC .................................................... G06Q 10/087
 See application file for complete search history.

(56) References Cited

U.S. PATENT DOCUMENTS

| | | | | |
|---|---|---|---|---|
| 11,010,710 B2 * | 5/2021 | Richardson | ............ | G06Q 10/08 |
| 11,176,588 B2 * | 11/2021 | Licht | .................. | G06Q 30/0613 |
| 11,861,579 B1 * | 1/2024 | Capers | ............... | G06Q 30/0202 |
| 2003/0126103 A1 * | 7/2003 | Chen | ...................... | G06Q 10/08 |
| | | | | 706/50 |
| 2011/0258045 A1 * | 10/2011 | Chickering | ............ | G06Q 10/00 |
| | | | | 706/12 |
| 2016/0364684 A1 * | 12/2016 | Nanda | ..................... | G06Q 10/04 |
| 2017/0330123 A1 * | 11/2017 | Deshpande | .......... | G06Q 10/087 |
| 2024/0070747 A1 * | 2/2024 | Loi | ..................... | G06Q 30/0281 |
| 2024/0177109 A1 * | 5/2024 | Van Erlach | ...... | G06Q 10/06315 |

FOREIGN PATENT DOCUMENTS

| | | | | |
|---|---|---|---|---|
| WO | WO-03042791 A2 * | 5/2003 | ............. | G06Q 10/06 |

* cited by examiner

*Primary Examiner* — Garcia Ade
(74) *Attorney, Agent, or Firm* — Van Pelt, Yi & James LLP

(57) ABSTRACT

Probabilistic inventory estimation includes receiving a set of records pertaining to an item, comprising: shipment data pertaining to the item, transaction data pertaining to the item, and at least one user inventory observation pertaining to the item. It further includes determining a probabilistic estimate of inventory of the item based at least in part on the shipment data, the transaction data, and the at least one user inventory observation pertaining to the item.

15 Claims, 9 Drawing Sheets

302
304
306
t1

Time

Inventory

700

Start

Receive records pertaining to an item 　　702

Determine, from the received records, a probabilistic estimate of inventory of the item 　　704

End

PROBABILISTIC INVENTORY ESTIMATION IN GROCERY

CROSS REFERENCE TO OTHER APPLICATIONS

This application claims priority to U.S. Provisional Patent Application No. 63/590,232 entitled PROBABILISTIC INVENTORY ESTIMATION IN GROCERY filed Oct. 13, 2023 which is incorporated herein by reference for all purposes.

BACKGROUND OF THE INVENTION

Existing inventory estimation techniques are ill-suited for the types of items found in environments such as grocery stores, resulting in inaccurate inventory estimations that can in turn lead to inaccurate ordering. Improved techniques for inventory estimation in such environments are needed.

BRIEF DESCRIPTION OF THE DRAWINGS

Various embodiments of the invention are disclosed in the following detailed description and the accompanying drawings.

DETAILED DESCRIPTION

Figure 1:
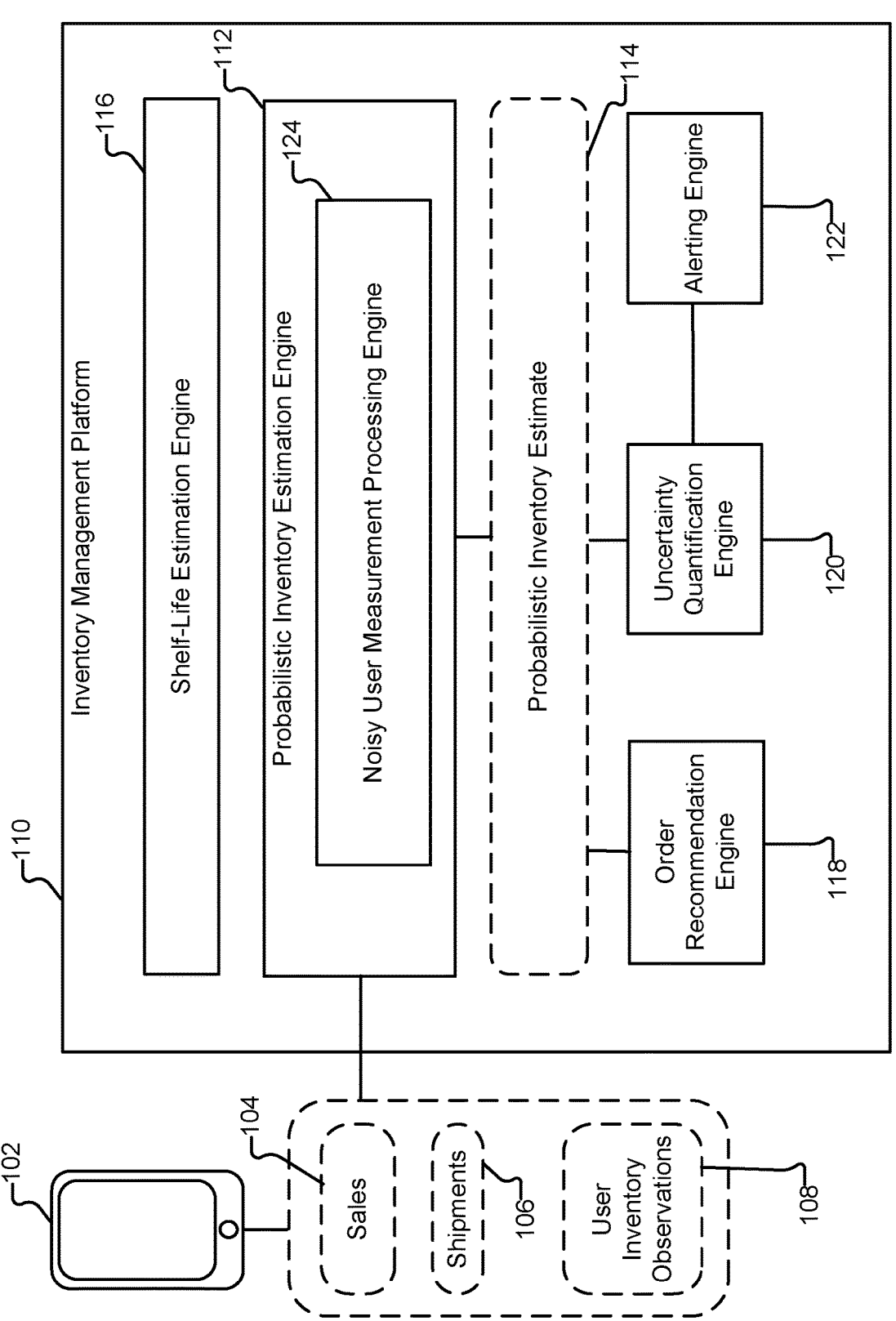
FIG. 1 illustrates an embodiment of a system for performing probabilistic inventory estimation and order recommendation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The following are embodiments of probabilistic inventory estimation. The techniques described herein improve the quality and accuracy of inventory estimates. The increased accuracy provided by the probabilistic inventory estimation techniques described herein facilitates the making of accurate recommendations for how much to order of items, without requiring users to continuously take inventory. In this way, more accurate inventory control is facilitated.

In an environment such as a grocery store that sells perishable items, existing techniques for inventory estimation, such as perpetual inventory estimation models, face various challenges and problems. One example problem with existing inventory estimation techniques is that they do not model perishability. This results in existing inventory models overestimating the amount of inventory, as the existing models are not aware of items being thrown out, or the occurrence of unrecorded food waste due to food items perishing (e.g., spoiling). The absence of modeling such perishability results in biases in the estimates of existing inventory models.

Another example problem with existing inventory estimation models is noisy user inventory data. For example, existing models may rely on user-taken counting of inventory. For example, a person may be tasked with taking inventory of the number of boxes of plums, the number of cans of sardines, etc. There can be empirically substantial errors in such human accounting of inventory. Such errors can dramatically reduce the quality of estimates of existing inventory estimation models such as perpetual inventory estimates, which in turn affects order accuracy.

As will be described in further detail below, the probabilistic inventory estimation techniques described herein address the aforementioned problems and issues with the quality and accuracy of existing inventory estimates. Further, by improving order accuracy with improved inventory estimates, environmental benefits may be realized, such as a reduction in food waste (by reducing, for example, inaccurate overestimates of an amount of a perishable item). Using embodiments of the probabilistic inventory estimation techniques described herein, sales can be maximized, while also reducing how much food is thrown out.

The probabilistic inventory estimation techniques described herein also provide various other benefits. For example, and as will be described in further detail below, embodiments of the inventory estimation system described herein produce probabilistic estimates. In addition to improving the accuracy of estimates, by producing probabilistic estimates, embodiments of the inventory estimation system are also capable of quantifying the uncertainty of the inventory estimates it produces, such as indicating a confidence that the amount of inventory of an item is within a range. As will be described in further detail below, the quantification of such uncertainty in inventory estimates further facilitates targeted requesting of inventory-taking, which, for example, provides the benefit of reducing the amount of human labor spent taking inventory.

Probabilistic Inventory Estimation System

FIG. 1 illustrates an embodiment of a system for performing probabilistic inventory estimation and order recommendation. In this example, a user, such as a produce manager, uses client device 102 to provide sales 104, shipments 106, and user inventory observations 108 to inventory management platform 110, such as over a network such as the Internet.

In this example, inventory management platform 110 includes probabilistic inventory estimation engine 112. Probabilistic inventory estimation engine 112 is configured to generate probabilistic inventory estimates for an item. In some embodiments, the probabilistic inventory estimation engine takes the sales, shipments, and user inventory observations as input to generate a probabilistic inventory estimate 114 for an item. In this example, probabilistic inventory estimation engine 112 includes noisy user measurement processing engine 124, which is configured to handle processing of noisy user measurements, further embodiments of which will be described below. In some embodiments, if the item for which inventory is being probabilistically estimated is perishable, then the probabilistic inventory estimation engine further takes as input shelf-life estimates generated by shelf-life estimation engine 116.

In some embodiments, and as will be described in further detail below, probabilistic inventory estimation engine 112 is implemented as a model that is configured to determine or infer the true latent inventory over time. In some embodiments, shelf-life estimation engine 116 and noisy user measurement processing engine 124 are implemented as sub-models, where one sub-model (implemented by shelf-life estimation engine 116) provides an underlying model of item perishability, and the other sub-model (implemented by noisy user measurement processing engine 124) describes the (noisy) process of users taking inventory.

The perishability and user inventory sub-models are used to produce probabilistic inventory estimations. In some embodiments, both sub-models are used in conjunction to facilitate probabilistic inventory estimation. In other embodiments, the sub-models may be used individually, separately, or independently of each other. For example, even if considering non-perishable items, the sub-model for handling noisy user inventory data improves the performance and accuracy of inventory estimation. Vice versa, even if there were totally accurate user inventory measurements, the modeling of perishability as described herein also improves the performance and accuracy of inventory estimation. Further details regarding models for perishability and handling noisy user inventory measurements are described below.

In this example, order recommendation engine 118 is configured to generate a recommended amount of an item to order based on the probabilistic inventory estimate 114 determined for the item. In some embodiments, uncertainty quantification engine 120 is configured to quantify uncertainty associated with the probabilistic inventory estimate 114. This includes determining calibrated lower and upper bounds on probable values of the inventory. In some embodiments, alerting engine 122 is configured to generate alerts. For example, based on the uncertainty quantification performed by uncertainty quantification engine 120, alerting engine 122 is configured to generate alerts to provide to users such as the user of device 102 to request targeted user inventory measurement taking, or to review the current inventory of specific items.

In some embodiments, platform 110 is implemented in the cloud (e.g., using Microsoft Azure, Amazon AWS, Google Cloud, etc.). In some embodiments, platform 110 includes task orchestration, as well as database management/querying (e.g., via Snowflake, BigQuery, etc.).

Inventory Hidden Markov Model (HMM)

Item inventory can evolve over time, such as day-by-day. For example, the available inventory for an item over time grows by +X as a shipment of X units comes in (e.g., at various points in time), and reduces by −Y as sales of Y units occur (which also occur over time). In the context of perishable items, the inventory also reduces due to, for example, the item perishing (e.g., unsold produce expiring, and having to be removed from inventory).

That is, the change in inventory from one day to the next depends on a number of factors, such as shipments that come in (that increase inventory) over time, as well as sales of the item (that decrease inventory). Such factors may be deterministic or treated randomly. For example, there may be historical records of shipment and sales data. However, in the case that sales/shipment data is missing, probabilistic assumptions or estimations of shipment/sales data may be made (e.g., based on past inventory levels and ordering history). The change in inventory is also dependent on other factors. For example, the determination of the inventory for tomorrow is dependent on how much inventory shrank out by the end of today. The amount of shrink that occurs is based on the perishability of items and when they expire, which is a random component that can vary. Due to this randomness in the amount of shrink, which is typically not recorded or directly observed, the actual state of the inventory at any given time is also unknown. In the case of inventory, user inventory measurements are examples of observations of the inventory of the item at certain points in time that can be used as data points, although, as described above, such observations can be noisy.

One model that can be used to describe the changing state of inventory over time is a hidden Markov model (HMM). While embodiments of representing inventory over time using a hidden Markov model are described herein for illustrative purposes, the probabilistic inventory estimation techniques described herein may be variously adapted to accommodate any other type of model or representation of inventory over time, as appropriate.

Figure 2:
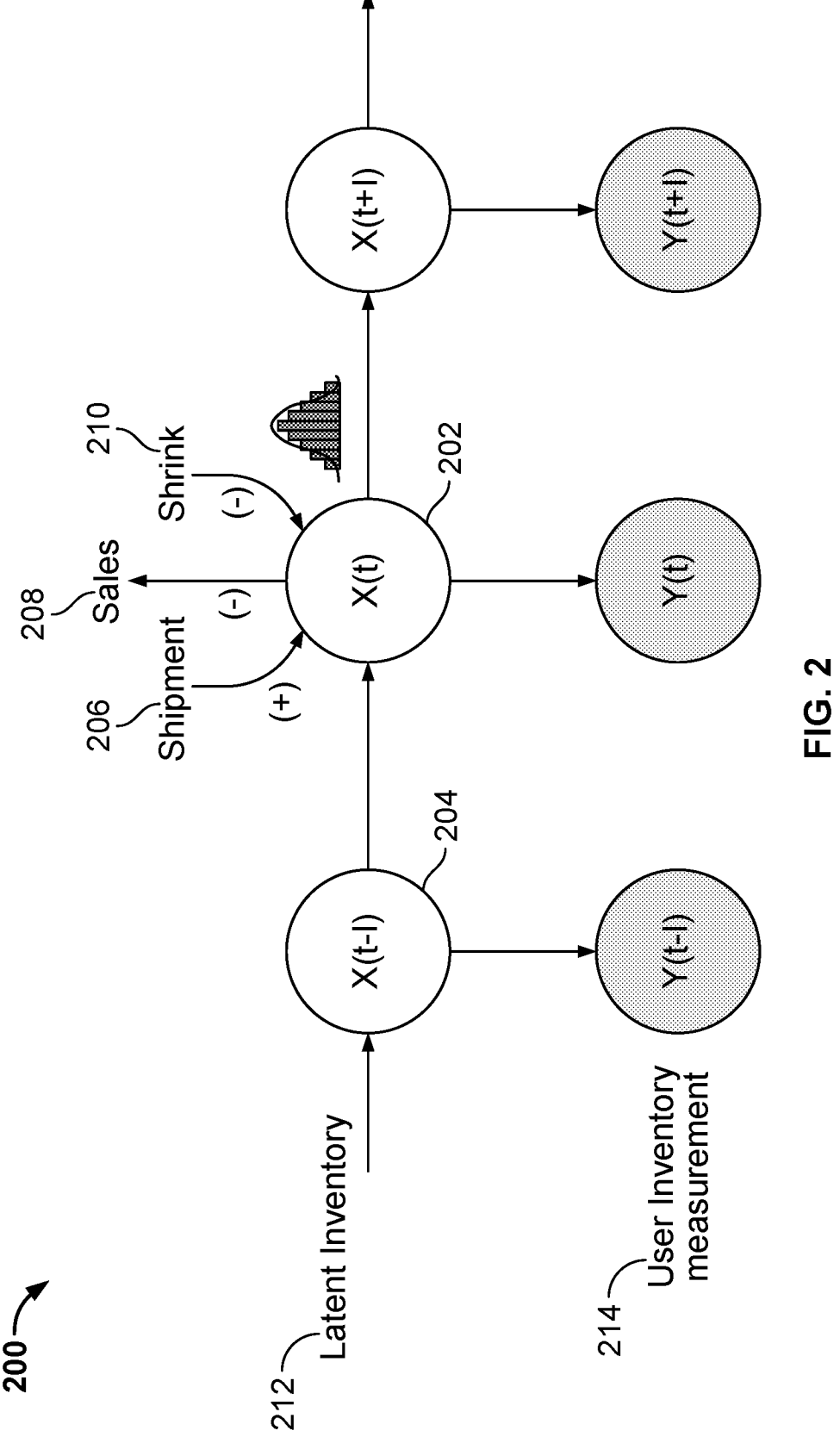
FIG. 2 illustrates an embodiment of representing inventory using an inventory hidden Markov model.

FIG. 2 illustrates an embodiment of representing inventory using an inventory hidden Markov model. In some embodiments, model 200 is implemented by probabilistic inventory estimation engine 112 of Platform 110 of FIG. 1. In this example, the latent variable is the latent (hidden) inventory 212, whose states on time t depend only on time t−1. In this example, the steps in the model correspond to time steps, at, for example, a daily granularity. Any other temporal representation at any other temporal granularity may be used, as appropriate.

As shown in the example of FIG. 2 the amount of inventory at time t (X(t), 202) can be computed by, starting with the inventory at time t−1 (X(t−1), 204), adding an amount of any shipment at t (206), subtracting an amount of any sales at t (208), and further subtracting the amount of shrink in inventory that occurs on day t.

As described above, the shipments and sales are deterministic factors that affect the amount of inventory from day to day. The amount of shrink of the inventory that occurs at the end of the day (which is used to compute the amount of inventory for the next day) is a random component that is being modeled using the inventory hidden Markov model described herein. As one example, the amount of shrink (which corresponds to a reduction in inventory due to items in the inventory expiring) is modeled probabilistically, where there is a range in the possible values of the amount of shrink, where each possible amount of shrink is associated with a corresponding probability (e.g., probabilistic distribution of amount of inventory shrink). As the amount of shrink can take on different values with different probabilities, this in turn causes the amount of inventory for the next day to also be variable, where the amount of inventory on the next day can also take on a range of values with associated probabilities. That is, the amount of inventory on the next day is random, because it is dependent on an amount of inventory shrink, which is random. With respect to the hidden Markov model representation, the probability that the amount of inventory will transition from having a certain value at time t to taking on a certain value at t+1 (in a range or set of possible values) is dependent on the probability that the amount of inventory shrink takes on a certain value (from a set of possible inventory shrinkage amounts).

One example way of modeling the amount of shrink is to determine the amount of shrink on a per-shipment basis (where the shrink in each shipment will contribute to a reduction in the latent inventory state over time). For example, shipments of a perishable item will occur at various points in time. Due to this, the items from different shipments will expire at different times (e.g., have different expiration dates). In one embodiment, the amount of shrink that occurs for a given inventory shipment is determined as the portion of the shipment (e.g., fraction of the shipment that contains some number of the perishable item) that is not sold by the expiration date. In this representation, the part of a shipment that is not sold off by the expiration date for the shipment is designated as food waste or shrinkage (since it will have to be taken off of shelves (e.g., out of inventory) due to expiration), which results in a loss in, or subtraction from, the latent inventory variable. For example, after a certain amount of time (e.g., beyond the expiration date) this portion of the shipment, even though not sold (and not part of sales), cannot be kept in perpetuity in the inventory (e.g., continue to stay as part of the inventory), and is subtracted from the inventory.

As described above, one example way of incorporating perishability into the probabilistic inventory representation described herein is to apply the perishability on a per-shipment basis. The following are embodiments of modeling, on a per-shipment basis, an expiration date for a shipment, as well as an amount of that shipment that will have perished (which in turn will contribute to a "shrink" in overall inventory) once that expiration date is met or exceeded.

In one example implementation of perishability in probabilistic inventory estimation, each shipment is associated with an expiration date. The expiration date is based on an estimate of the shelf life of the item. In one embodiment, the shelf life of an item is modeled using a probabilistic distribution. For example, the shelf life of a banana can take on values from 3 days to 7 days, with the different shelf-life values having corresponding probabilities. In one embodiment, selecting a shelf life for an item includes drawing a specific shelf-life value from the probabilistic distribution of shelf life, where that specific shelf-life value is drawn with some probability, according to the distribution.

The estimated shelf-life is then used to determine an expiration date for the shipment. For example, a specific shelf-life value is drawn or sampled from the probabilistic distribution of shelf-life for the item. The expiration date for the shipment is the date at which the shipment arrived, plus the drawn shelf-life (the expiration date may also be computed by adding the shelf-life to other starting times, such as the time at which a shipment of the item was packaged, as appropriate). In some embodiments, the expiration date (which is also a random variable in this example, since it is derived from shelf-life, which is a random variable) is used to determine when a shrink in inventory occurs. As one example, suppose that a shipment of the item was received at time t–3, where the shelf-life for the item is predicted to be 3 days. The expiration date for this particular shipment of the perishable item is then determined as time t. When that point in time t, is met or exceeded, then whatever portion of that shipment that was unsold is removed from the inventory at time t. In some embodiments, prior to time t (the expiration date for the shipment), all of the shipment of the item is counted in the inventory.

In the above example, the fraction of the shipment that is unsold and expired is subtracted from the inventory as of the expiration date. In some embodiments, the part of the shipment that is expected to be unsold and have to be removed from inventory is referred to herein as a shrink fraction. In some embodiments, the shrink fraction is determined based on evaluation of historical shipment/sales of the item. As one example, for illustrative purposes, suppose that the shrink fraction for a banana is determined to be 0.2. This shrink fraction indicates that 20% of the shipment of bananas is estimated to have gone unsold by the expiration date, and thus, 20% of the bananas in the shipment is to be subtracted from the inventory as of the expiration date. For example, after the expiration date, it is expected that 20% of the bananas from that shipment remain unsold, and have to be removed from shelves (e.g., cannot be left on shelves because they have expired or are spoiling). In some embodiments, the shrink fraction is a fixed quantity. In other embodiments, the shrink fraction is a random/variable parameter. In some embodiments, the shrink fraction is configurable/adjustable.

The following are further embodiments of modeling inventory over time using a hidden Markov model. In the example of FIG. 2, the latent inventory over time (e.g., time t–1, t, and t+1) is represented by the latent inventory state X. The latent inventory state is a variable that is to be inferred by the probabilistic inventory estimation model from observable variables such as sales, shipment, and user inventory observations, along with a predicted amount of shrink, which is modeled as a random variable.

The latent inventory state evolves day-to-day over a time series (a portion of this time series, with time t–1, t, and t+1 is shown in the example of FIG. 2). The manner in which the latent inventory evolves day-to-day is a function of the sales, shipments, and the shelf-life. For example, in the absence of any other data (where, for example, the user observations may be sparse, with days-long gaps between observations), the sales data, shipment data, and the shelf-life estimates (for perishable items) are used to determine, for the base model, how the inventory evolves, probabilistically, from day to day. As described above, in some embodiments, the latent variable shown takes into account inventory disaggregated by its expiration date (e.g., where different shipments that are received at different times will have different expiration dates). As such, an amount of shrink (reduction in inventory for a certain target day) will depend on whether a previous shipment has reached its expiration date.

In this example, in the context of modeling inventory as a latent variable in a hidden Markov model, sales, shipment, and shelf-life estimates determine the transition probabilities from the state of the variable at one day to the next.

The following is an embodiment of determining the latent inventory variable X on a given day t. As one example, on the given day t, the inventory is determined as the sum of all of the shipments up to day t (e.g., starting from an initial date, that may be initialized with a (randomly) selected inventory level), minus the tracking of the sales up to day t, with a certain amount or faction of the shipments from the days leading up to (and including t) also subtracted out due to some portion of the shipment perishing because a shipment's expiration date has been reached (according to the shelf-life estimate).

The following are further embodiments of accounting for how much of a shipment will shrink out (and should be subtracted from the inventory) due to perishability of the item.

As described above, in one example, shrink is captured by applying an amount of shrink to each shipment that has come in over time—for example, shrink is accounted for by determining what portion of a shipment on a given day is now food waste. That is, shipments will come in over time. Portions of the shipment of the item will shrink out and go to waste at various times, and can no longer be considered inventory.

In some embodiments, the amount of a given shipment that will shrink out (and have to be deducted from inventory), and when that shrink will occur or take place, is determined according to the following two parameters:

Expiration date: in some embodiments, the expiration date for a specific shipment is predicted from a shelf-life estimate that is drawn according to a probability of distribution of shelf life for the item. Different shipments may be associated with different expiration dates. For example, if a shipment arrives on day t, and the estimated shelf-life is drawn to be 3 days, then the expiration date is at time t+3. In some embodiments, the shelf-life estimates used to generate the expiration dates are determined by shelf-life estimation engine 116 of platform 110.

In some embodiments, the estimate of the shelf-life item is based on grocery sales and shipment data. For example, suppose bananas are estimated. The shelf-life estimator is configured to take sales and shipment data for bananas (across multiple grocery store locations in some embodiments) as input and determine, from patterns in the sales and shipment data, an estimate of the shelf-life of bananas.

Shrink fraction: in some embodiments, the shrink fraction is a percentage or portion of the particular shipment that will be shrunk out (and removed from inventory) as of the expiration date (determined as described above). In some embodiments, the shrink fraction is determined as a function of shipment and sales data. For example, if for every case of bananas that are ordered, 80% of a case is sold, then the shrink fraction for shipments of bananas is estimated as 0.2. This historical sales and shipment data provides a base distribution of how much of the case will shrink out (because it has not been sold, and will eventually perish after the estimated expiration date). For example, put another way, the shrink fraction is a predicted fraction of a shipment that will go to waste due to not having been sold by the expiration date. That is, in some embodiments, the shrink fraction is the fraction of a shipment that is predicted to go unsold by the expiration date.

The following is an example of utilizing expiration date and shrink fraction to determine an amount of shrink. For example, suppose a shipment includes 100 bananas and the shrink fraction is 20%. If the expiration date for a given shipment is 5 days, and the shipment was received at time t−5, then at time t, the expiration date is met, and 20 bananas are subtracted from the inventory. In some embodiments, prior to the expiration, none of the bananas from the shipment have yet expired, and no shrinking out of items from that shipment is performed. In this example, once the target date t is past the expiration date of some past shipment, then a certain amount of items from that shipment is shrunk or discounted out, given the shrink fraction.

Referring to the example of FIG. 2, in some embodiments, when determining shrink 210 for time t, it is determined whether the expiration date for a prior shipment has been met (which is a random variable, as it is determined based on a shelf-life estimate, which is random). If so, then the shrink (to subtract from inventory) is determined using the shrink fraction multiplied by the number of the items in that shipment whose expiration date has arrived or been met.

In the above examples, the expiration date and shrink fraction are two examples of random perishability-related variables that are simulated out, based on shelf-life estimates. In this way, subtraction from or reduction in available inventory is not only due to sales, but also due to perishability of items received in shipments over time. When to deduct a fraction of a shipment from inventory is based on an amount of time that has elapsed since the shipment and an expiration date for the shipment that is determined based on an estimate of shelf life for the items. In conjunction with the expiration date, the shrink fraction is used to determine a perishability adjustment factor for a given shipment that is used to determine when items in a given shipment expire, and an amount from the shipment to remove from inventory when the expiration date is met. In some embodiments, the perishability adjustment term is a random adjustment that is learned by the probabilistic inventory estimation model described herein.

Probabilistic Estimation of Inventory Using Inference

With the example representation of inventory as a latent variable of an inventory HMM as described herein, the probabilistic estimate of the current inventory of an item (e.g., as of today) is implemented as an inference task. One example implementation of the inference task is by performing particle filtering. For example, particle filtering is used to make an inference about the latent inventory state. In embodiments of the particle filtering described herein, the probabilistic distribution of the current inventory is estimated via simulation of particles. While embodiments of probabilistic inventory estimation by performing inference using particle filtering are described herein for illustrative purposes, the probabilistic inventory estimation techniques described herein can be variously adapted to accommodate any other type of inference or filtering, as appropriate.

As one example of particle filtering for probabilistic inventory estimation, each particle represents a possible trajectory or path of the inventory over time, until the target time for which an estimate is to be made (e.g., for the current day). There will be numerous paths of inventory over time (e.g., many different sequences of inventory values over time) because the time at which shrinking occurs due to a portion of a shipment being unsold and expiring is random (because the expiration date for a shipment is random because the shelf-life estimate for the item is random). For example, the perishability of an item is modeled by simulating various perishability scenarios. The simulation of the perishability scenarios is performed due to a lack of direct measurements of shrink or food waste from the stores. That is, the perishability of an item is a random unknown. The simulated perishability scenarios are samples of possible trajectories or ways in which food waste (shrink) might arise in a grocery store.

For example, at a given time step, the amount of a shipment (that occurred in the past) to remove from the overall inventory of the item is based on whether the expiration date for that shipment has been reached. For example, if the expiration date has been reached for the shipment at time t, then a fraction of that shipment is removed from the inventory determined for time t. If not, then the reduction is not performed. Different expiration dates simulated for the same shipment would potentially result in different inventory values being generated (sampled) for time t. This is an example of divergence that would occur for two different particles charting different inventory trajectories over time.

As shown in this example, given a certain value of the inventory at time t, there are multiple values that the inventory at time t+1 could be, where the probability of transitioning from a certain value of inventory at one time step to some value of inventory at the next time step is based on the probability of some past shipment having reached its expiration date. As there can be many shipments over time, each with different sampled expiration dates, simulation of numerous particles will result in many different values for the inventory at the current or target time to be produced, with varying frequencies. In this way, the probabilistic distribution of the inventory as of the current time (or any other time step or index of interest, as appropriate) is built up or inferred or estimated via the sampling performed via the particle filtering described herein.

As one example, suppose two particles, where each particle is used to simulate the evolution of the inventory of bananas over time. That is, two simulations of inventory estimation are performed. Suppose that both particles (simulations) start from time t=0, with the same initial inventory value, and that the inventory as of the current day (time=t) is to be simulated. In this example the same shipment and sales data is used for the two particles. That is, the same amounts of bananas are shipped and added to the inventory at the same times between the two simulations, and the same amounts of bananas are sold and removed from the inventory at the same times between the two simulations.

Suppose, however, that the shelf-life of the item has a probabilistic distribution, where the shelf-life is estimated to be either 3, 5, or 7 days, where each of the values of shelf-life is associated with a certain probability (e.g., 0.1 for 3 days, 0.7 for 5 days, and 0.2 for 7 days) according to the distribution. Now suppose that for the first simulation, every shipment's shelf-life is sampled to be 7 days, and for the second simulation, every shipment's shelf-life was sampled to be 3 days. In tracking the day-by-day evolution of the two particles from the starting day to the current day, the two particles will eventually arrive at different simulated values for the inventory for the current day (time=t). Further, a simulation in which the sampled shelf-life for every shipment was 5 days would yield yet another different simulated value for the inventory at time=t. If a different shelf-life estimate (and thus expiration date) is sampled for each individual shipment, then different particles (simulations) would yield further different values of the current inventory. This is in part because, for example, with different expiration dates of shipments sampled, the cumulative amount of shrink from shipments that would have accumulated up to the point of the target time would be different. By running multiple simulations with multiple particles, numerous simulated values of the inventory are determined. In this way, the set of values that the state of the inventory as of the current day can take on can be estimated. The probability that the inventory on the current day will take on any specific inventory value can also be estimated, such as from the frequency at which that specific inventory value for the current day appeared in the simulations of the particles. In this way, a probabilistic distribution for the state of the inventory as of the target index of time (e.g., current day) is estimated.

As described above, the shelf-life estimate of a perishable item determines when some portion of a shipment of the perishable item will be removed from inventory. Simulating the variation in when the shrink in inventory due to the expiration date of a shipment having been reached results in varying inventory values being simulated for a given point in time.

The following are further details regarding using a shelf-life estimate to model perishability. In contrast to existing inventory estimation models, such as an existing perpetual inventory model (where a shipment arrives in a store, and subsequent perishability is not modeled), the shelf-life of an item is used to simulate what would happen if a perishable item such as bananas went bad within a range of expiration dates. In some embodiments, the range of expiration dates is determined based on the estimated shelf-life for bananas, as described above. The perishability of the bananas is modeled based on the simulation of what occurs if some fraction of a shipment of the bananas goes bad. Various perishability scenarios may be simulated. The simulation of such scenarios is performed in part due to the absence of any direct measurements of shrink or food waste from stores.

As described above, in embodiments of the inventory HMM representation described herein, moving between any two states of the latent inventory variable (e.g., moving between values in the set of values that the inventory can take on) is based on determining a set of transition probabilities. The set of transition probabilities is based on the probabilistic distribution of the shelf-life, as described above. When simulating a particle, the particle's evolution (e.g., path or trajectory or sequence of inventory values that the particle takes on at each time step, from the start time of the simulation up to the current day or target time) is determined by sampling or selecting some transition based on the transition probabilities. For example, simulating a particle includes simulating the impact of shipment shrink at various times on inventory.

In some embodiments, in the inventory HMM described herein, user inventory measurements (e.g., user inventory measurements 214) are treated as observations. In some embodiments, the observations are used to update the inventory HMM.

As one example, the particle filtering will result in various inventory trajectories being simulated. In some embodiments, the user inventory observations (which may occur sporadically over time, and not necessarily at every time step) are used to trim the sampled trajectories that are unlikely to have actually occurred. As one example, when a day is arrived at for which there is a user inventory observation, the estimated or sampled inventory level is compared against the user inventory observation. A determination of whether too much or too little shrink was sampled during this simulation is made based on the comparison (e.g., by determining whether the deviation between the sampled inventory level and the user observation is greater than a threshold). If the deviation between the sampled inventory level and the user observation is beyond a threshold, then resampling is performed, with the previously sampled particle trajectory now trimmed.

As shown in this example, the user inventory observations are used to perform resampling to trim or remove unlikely particle trajectories, and to promote trajectories that are more likely to actually occur. In this way, unlikely values of the inventory as of the target time will not be simulated, improving the accuracy of the probabilistic inventory estimate. For example, a determination of which trajectories are more likely or less likely is based on received user inventory observations. Those trajectories that are less likely are removed, and those trajectories that are more likely are promoted.

Weighted Resampling of Particles Based on User Inventory Observations

As shown in the above, resampling of trajectories is performed based on deviation from user inventory measurements. However, the user inventory measurements can also be noisy.

For example, while users such as produce managers can be asked to manually take inventory, this can be very time-consuming, as a produce manager may have to review and update the inventory of upwards of 500 items per day. Further, the manual inventory taking can be prone to error, as there is a large amount of items that a user may review very quickly, resulting in less accurate measurements. Relying completely on such manual inventory measurements can have a negative impact on order recommendation. Embodiments of the probabilistic inventory estimation techniques described herein provide robustness against such noisy user inventory measurements, and provide various additional benefits, such as reducing the amount of human labor, and improving the user experience, as well as the recommendations being made.

The following are embodiments of utilizing user inventory observations in determining a probabilistic estimation (e.g., estimate of the probability distribution) of inventory of an item as of a target time in a manner that is robust to noise, errors, and inaccuracies in the user inventory observations. Examples of accounting for noise in the user inventory observations when performing resampling of particles are described below.

In some embodiments, accounting of noise in user inventory observations includes modeling the user inventory observations as a noisy process, with some probability distribution. In some embodiments, the resampling is weighted based on the modeling of the user inventory observations as a noisy process. For example, particle resampling is performed with updated transition probabilities that are adjusted based on a posterior probability determined based on the user inventory observation. As one example, user inventory observations are modeled probabilistically, where there is an associated probability distribution that indicates the probability that a user inventory observation takes on a certain value.

Referring to the example of FIG. 2, the user inventory observations are referred to as a variable "Y" (214). In some embodiments, the user observations are weighting the state estimates on a day-to-day basis by the data points that are the user inventory observations.

In some embodiments, to generate the estimate for a given day, such as X(t) (where t is the target time, such as the current day), the modeling is run day-by-day (e.g., from an initial step or time) to reach the target time t. As part of this process, at each day, a step is performed where, given sales data, shipment data, and simulating out of perishability of portions of shipments (which is a random process), a simulation for that day is performed.

This results in generation of a cloud of random scenarios. The cloud of scenarios are guided by reweighting them based on the actual user observed/measured inventory for that day. That is, the estimated inventory predicted for a given day is reweighted based on the actual user observation or measurement of inventory for that day (assuming there is a user observation data point corresponding to that day). If there were no user observations for a day, then reweighting is not performed (there will not necessarily be user observations for every single day).

The following are further embodiments of incorporating user inventory observations when determining the probabilistic distribution of the latent inventory state for a target time or step.

In this example, the state of the inventory over time is represented as a chain. In some embodiments, for any point in a chain, suppose at a target time t, the probabilistic distribution for the inventory as of the target time or step is determined as a distribution of a set of particles. For example, as described above, a particle filter is used. As one example, each particle is a simulation or random iteration of the process performed by the probabilistic inventory estimator model (inventory HMM).

For example, multiple simulations (e.g., n simulations) of the inventory hidden Markov model process are run, resulting in, for a time given target time t:

$$X_t^{(1)}, X_t^{(2)}, \ldots, X_t^{(n)}$$

That is, multiple predictions for the value (amount of inventory) at time t are determined based on numerous simulations according to the inventory hidden Markov model described herein. In this example, each of the particles is a single value that is produced as output of running a single simulation of the inventory hidden Markov model with, for example, a randomly selected item expiration date (determined based on drawn shelf-life values from a distribution of shelf-life estimates).

In the above example, for each particle, a weight is computed. As one example, the weight of particle (i) for the step t in the inventory hidden Markov model is equal to the probability of the observed inventory on that day, given that the latent inventory is equal to the particle. For example:

$$w_t^{(i)} = P\left(Y_t \mid X_t = X_t^{(i)}\right)$$

where $Y_t$ is the user inventory observation at target date t. In some embodiments, the model is based on that the user observation, conditioned on the inventory, is normally distributed, with mean $X_t$ and some noise:

$$Y_t \mid X_t \sim N\left(X_t, \sigma^2\right)$$

where the above results in an analytical expression for the probability for the weight. Other distributions of the user observation conditioned on the simulated inventory level can be utilized, as appropriate.

In some embodiments, resampling of the particles is performed according to the weights. For example, $$X_t^{(i)}$$

13 is resampled with probability proportional to $$w_t^{(i)}.$$

In this way, particles that are consistent with the user inventory observation are upweighted, and particles that are inconsistent with the user inventory observation are downweighted. By modeling the noise and the user inventory-taking behavior, the level of upweighting and down-weighting is controllable.

For example, if the user taking inventory observations is deemed to be untrustworthy, then effectively, resampling is not performed because the user inventory observation $Y_t$ would not provide useful information in determining which particle is more likely than another—that is, all particles outputted by the simulation are equally likely. In some embodiments, an assumption is made that there is a consistent amount of noise in the user observations. The distribution of the user inventory observation can be modeled dynamically as well.

The following is an example of incorporating user observations into the inventory hidden Markov model.

In this example, suppose after running simulations, the following three particles are produced as output of the simulations:

$$X_t = (1, 2, 3)$$

Now suppose that for step (day) t, there was a user inventory observation, where:

$$Y_t = 3$$

Suppose the user is a trusted observer. In this example, suppose the following weights corresponding to the particles of $X_t$ $$W_t = (0.1, 0.5, 1)$$

In this example, the user is trusted, and the weight for the particle $X_t$ with the value of 3 is given a weight of 1, as the user inventory observation is the same as the particle value of 3. The particle with the value of 2 is weighted less, because the particle's value is not the same as 3. The particle with the value of 1 is weighted even less (with 0.1), because the particle's value is even further from 3.

Based on these weights, resampling of $X_t$ is performed, where a resampled set of particles is received, such as $$X_t^* = (3, 2, 3).$$

In this example, the particle value of 3 will be sampled with higher probability because it is more consistent with the user inventory observation data. The particle value of 2 is resampled with slightly less probability, but is still somewhat consistent with the data. The first particle value of 1 is very inconsistent with the data, so it does not appear in the resampled particles.

The following are further embodiments of implementing weighted particle resampling based on user inventory observations. In this example, for each day, a value is simulated. For example, for each day, sales data and shipment data are inputted (if any). The latent inventory for that date is predicted. In some embodiments, particles are mutated based on the transitioning from the prior day. For example, the mutating is performed by applying a random perturbation by simulating different expiration dates (based on simulating different values of shelf life) for different shipments. For example, a particle for a day can be simulated with an expiration date of a shipment being 5 days, while another particle for the day could be simulated with a different drawn expiration date of 7 days for the shipment. In this example, the mutating influences the transition probability.

In some embodiments, the weighted resampling of particles based on modeling of user inventory observations as a noisy process is implemented by noisy user measurement processing engine 124 of platform 110.

The inventory HMM and inference via particle filtering can also be adapted to accommodate non-perishable items. For example, in the context of non-perishable items, a starting amount of inventory is determined as an initialization parameter which has a distribution with some uncertainty. For example, the variation in the particles is due to how the inventory HMM is initialized. For non-perishable items, there is not a random shrink factor for shipments. For nonperishable items, the particles evolve due to re-sampling based on user inventory data. For example, user inventory observations are not assumed to be completely accurate, and are instead modeled as having some noise. In this way, because the user inventory observations are probabilistic, they are not treated as the true actual inventory at the time when the user observation was taken. That is, although there are user inventory observations, because they are modeled as noisy, the true inventory level at any given time can still be considered as an unknown, latent variable.

The following are further embodiments regarding resampling. In some embodiments, resampling includes accounting for the emission probability, which is based on there having been an actual user inventory observation for that day (where the actual user inventory observation is the observable that is being emitted from the latent inventory hidden Markov model process). In some embodiments, resampling results in obtaining a posterior probability of the inventory on that day, conditioned on all of the inventory data up to, and including that day.

In some embodiments, resampling includes adjusting the likelihood of the latent variable taking certain values given the observed user inventory observations. For example, determining a particle includes taking a random sample of the latent process. Resampling includes adjusting the random sampling to be proportional to its consistency with the user observations. Resampling includes ensuring that the particles will have the posterior distribution, so that the distribution of values for a particle is affected by the user inventory observations.

For example, for a given day, a particle value will be sampled based on the previous day and transition probabilities pertaining to sales and shipment data. If there is a user observation for that day, then a weighted resampling of the particle is performed. That is, given the emission of the observed user inventory data, the probabilistic distribution of the hidden inventory variable is updated.

With the separate particles, the particles are not being simulated completely independently. Rather, suppose 100 simulations are occurring each day. At the resampling step, some of the simulated particles are downweighted, and other simulated particles are upweighted. The downweighting effectively makes certain values less likely. When resampling, this results in the downweighted values appearing less. The upweighting effectively makes certain values more likely to be sampled. When resampling, this results in the upweighted values being drawn more often. In this way, the weighting adapts the distribution of the hidden inventory to be more consistent with the statistics of the user inventory observations.

The effects of the weighted resampling will carry forward or propagate to the next day, as the next day's inventory is determined from that day's inventory.

The weighted resampling is analogous to evolution and natural selection, where if there is a population of a fixed size, individuals with higher fitness (e.g., more consistent with user inventory observations in the inventory context) will have more offspring in the subsequent generation than other less fit individuals. This is analogous to the resampling weights being higher for some particles than others. The higher weighted particles have more descendant particles in the next time step.

As described above, the probabilistic inventory estimation techniques described herein use inventory data to up-weight or down-weight the different simulated trajectories involving the different perishability scenarios. The weighting up or down of the trajectories is based on the consistency of the trajectories with the user inventory data. As one example of measuring consistency of the trajectory with the user inventory data, the log-likelihood of the user inventory measurements is measured, supposing the latent inventory were equal to a particular trajectory value. Trajectories with a high log-likelihood are determined to be more consistent/up-weighted.

This is in contrast to existing models such as standard perpetual inventory models, which start with the last inventory value that a user took, and add in the subsequent shipments leading up to the present day, where subsequent sales leading up to the present day are subtracted out. Such existing models effectively treat the last user inventory measurement as ground truth (even if noisy).

Using the techniques described herein, the user inventory measurements are not assumed to be ground truth and completely accurate. Rather their contribution to inventory estimation is weighted.

In some embodiments, the user inventory modeling described herein is a modular design that is applicable to any arbitrary model of how a user takes inventory. For example, the user inventory modeling described herein is adapted to account for users who take inventory in a biased way, such as consistently under reporting inventory. The user inventory modeling described herein can also account for multiple users having varying levels of accuracy in the measurements that they take.

Using the quantitative weighting model described herein, inventory estimation is not completely anchored to the user inventory measurements. Rather, a quantitative weighting is used, allowing the inventory estimation to be more robust to inaccurate user measurements. For example, the impact of inaccurate user measurements on probabilistic inventory estimation is reduced. The user measurement weighting model is applicable to any sort of way that a user might take inventory. For example, if a user accidently recorded an inventory measurement that was 10 times too high, the user inventory measurement would be weighted down such that its impact on probabilistic inventory estimation is reduced.

This is in contrast to existing models, which are anchored or completely reliant or dependent on the user inventory measurements, and assume the user inventory measurement to be completely accurate.

Figure 3A:
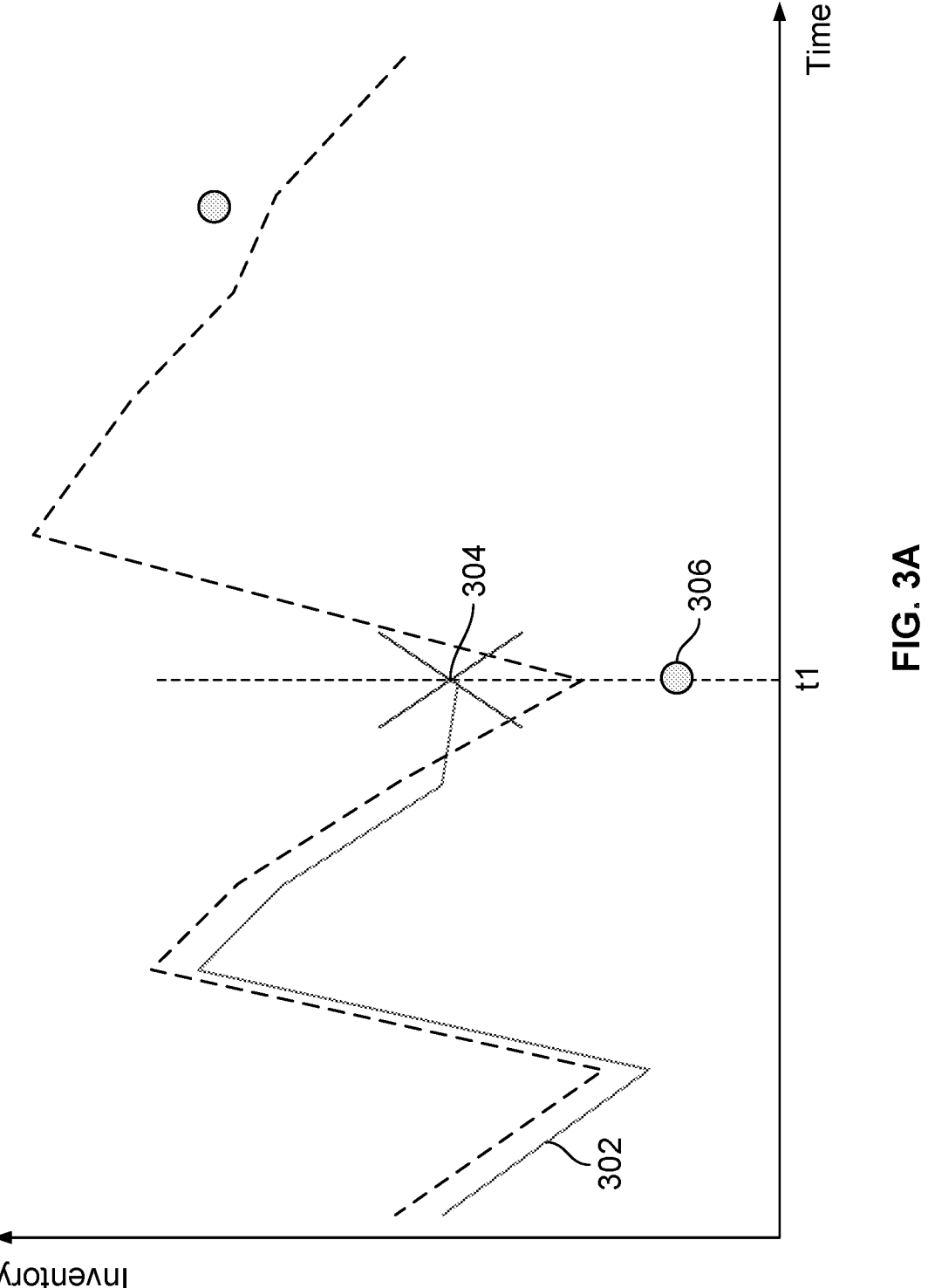
FIGS. 3A-3C illustrate embodiments of resampling of particle trajectories.
Figure 3B:
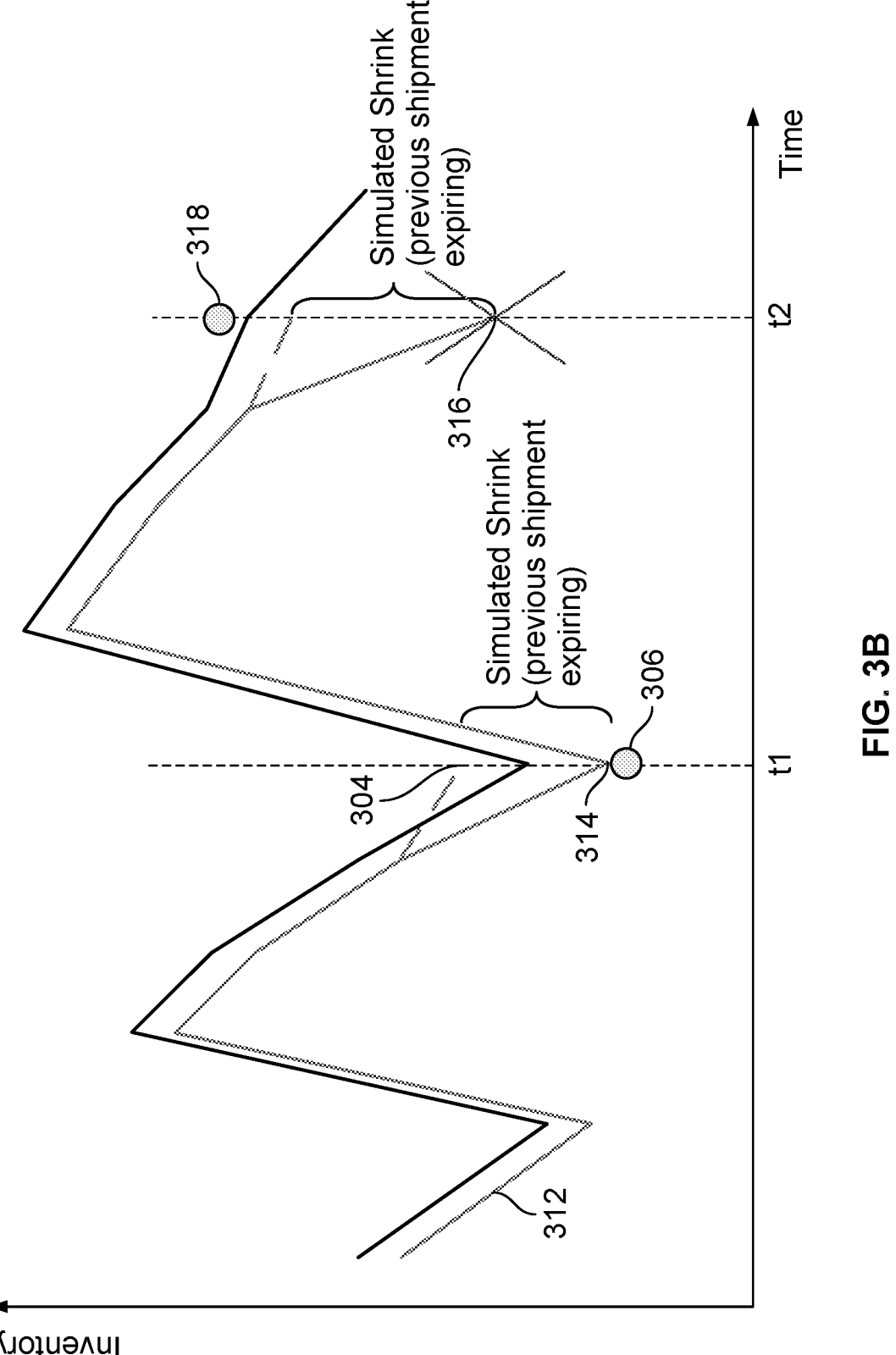
Figure 3C:
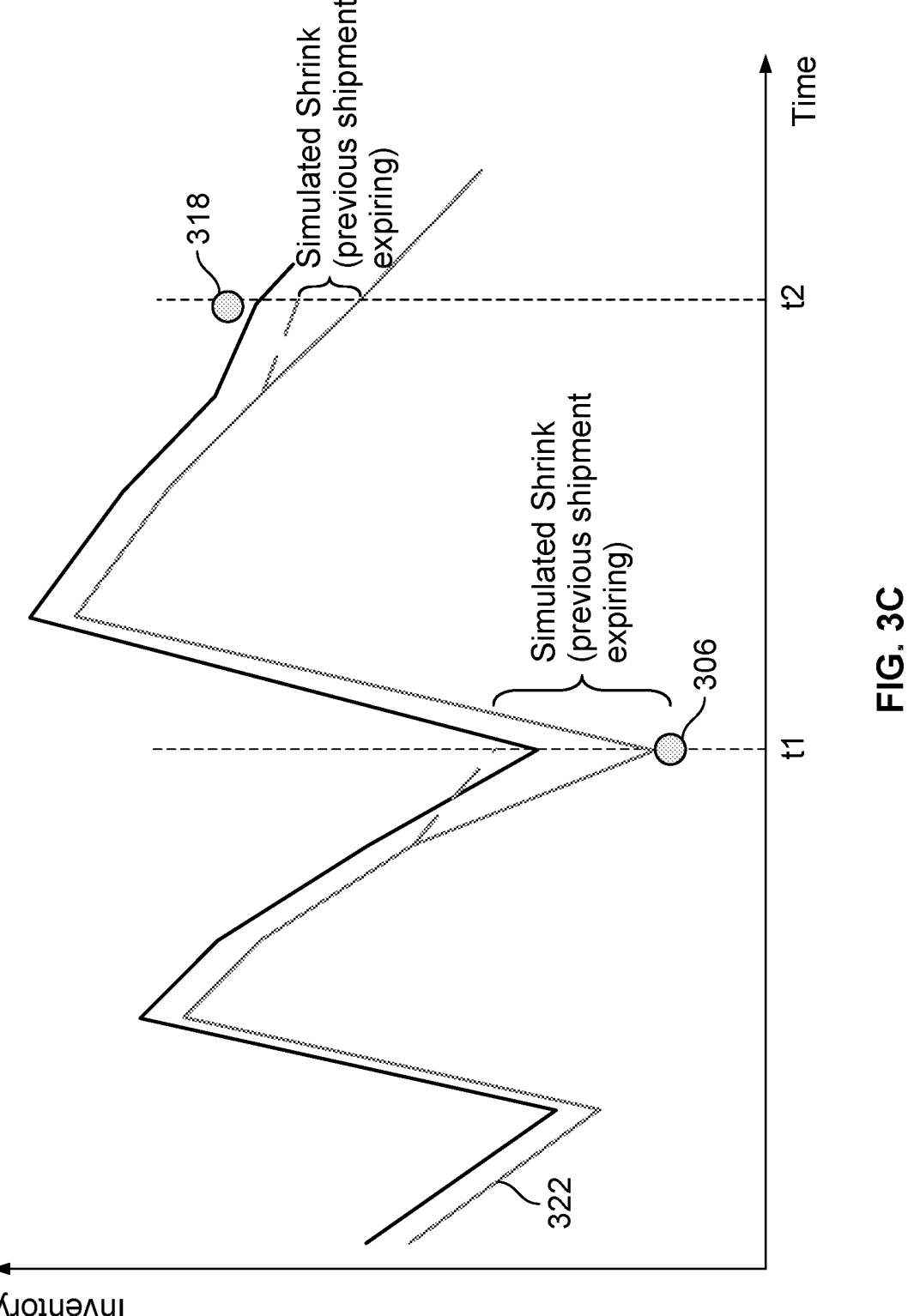

FIGS. 3A-3C illustrate embodiments of resampling of particle trajectories. In the example of FIG. 3A, suppose a particle trajectory 302, which is a simulated path of the inventory level of an item over time. In this example, trajectory 302 is simulated according to embodiments of the inventory HMM described herein. Suppose that at time t1 of the simulation, the inventory level is simulated to be as shown at 304. Suppose in this example that there is also a user inventory observation 306 at time t1. That is, there is an actual user inventory observation at time t1. The simulated inventory level for time t1 is then compared to the user inventory observation at time t1. Based on a deviation between the simulated inventory level and the user inventory observation, it is determined whether to perform resampling of the particle (e.g., to remove the particle trajectory 302 and generate a new sample particle, or to adjust trajectory 302 into an updated particle trajectory). In this case, when a time step is reached for which there is a user inventory observation, it is determined whether resampling of the particle should be performed. For example, the simulated inventory level at that time is compared to the user inventor observation at that time.

In this example, the simulated inventory level is much higher as compared to the user inventory measurement at time t1 (e.g., deviation is above a threshold), and resampling is initiated in response. For example, an insufficient amount of shrink is determined to have been simulated in trajectory 302. In this example, a new trajectory is sampled, resulting in the new trajectory 312 as shown in the example of FIG. 3B. As shown in this example, the user inventory measurement is used to determine too much or too little shrink was simulated, in which case resampling is triggered.

In the example of FIG. 3B, for new trajectory 312, at time t1, because there is a user inventory measurement at that time, the trajectory is checked to determine whether resampling should be performed. In some embodiments, the resampling check is performed as the trajectory moves from one time step to the next.

In this example, because shrink was simulated (due to a previous shipment expiring), the simulated inventory level 314 for newly sampled trajectory 312 at time t1 matches closely to the first user inventory measurement (as compared to the simulated inventory 304 of the previous trajectory 302). In this case, because the simulated inventory level at time t1 for trajectory 312 matches to (or is otherwise consistent with) the user inventory measurement 306, resampling is not performed.

Now suppose that the particle with trajectory 312 continues to progress forward in time. The particle has now reached time step t2. Based on the trajectory of the particle thus far, the simulated inventory level at time t2 is shown at 316. There is a user inventory measurement 318 at time t2. A determination is made as to whether trajectory 312 should be resampled, by comparing the simulated inventory level with the user inventory measurement. In this example, the simulated inventory level is much lower than the second user inventory measurement input 318. Here, in this example, it is determined that too much shrink has been simulated. In this example, based on the amount of deviation between the simulated inventory level and the user inventory measurement 318, re-sampling of the particle is performed. In this example, the resampling results in trajectory 322 of FIG. 3C.

FIG. 3C illustrates an embodiment of a likely particle trajectory. In this example, the simulated amounts of shrink for expiring previous shipments over time have yielded a trajectory where the simulated inventory levels at the times of the user inventory measurements (306 and 318) align or are consistent with the user inventory observations. For example, as compared to trajectory 312 of FIG. 3B, the trajectory 322 of FIG. 3C has simulated slightly less inventory shrink for time t2. In the example of FIG. 3C, because trajectory 322 appears likely compared to the user inventory measurements, this trajectory is not re-sampled.

While re-sampling of particle filters is shown one-by-one across the examples of FIGS. 3A-3C for illustrative purposes, in some embodiments, the particle resampling based on user inventory measurements is performed in parallel. For example, numerous particle simulations are run at the same time to estimate or infer a probabilistic estimate of inventory for a target time.

Improvements Provided by Inventory HMM

The following examples illustrate the improvements provided by embodiments of the inventory HMM techniques described herein, as compared to existing inventory models. For example, the below illustrate the robustness of the probabilistic inventory estimation techniques described herein to noisy user inventory observations, as well as the improvements to inventory estimation accuracy by accounting or factoring in estimations of the perishability of an item. In the following examples, comparison and improvements to existing inventory models, such as perpetual inventory models, are shown.

One problem with existing inventory estimation models is that they assume nonperishable items, in which case the current inventory (e.g., today's inventory) is computed as the inventory on the previous day, minus sales, and plus shipments. However, such existing perpetual inventory models are inaccurate when dealing with perishable goods, as they do not take into account the shrink in inventory due to being unable to sell perishable foods that are past their expiration date, for example. The perishability of food items is a random unknown that is typically not recorded, which in turn causes the actual inventory level of an item to be an unknown without a direct user inventory observation.

If perpetual inventory models were used to estimate the inventory for such perishable goods, this would result in an error that would increase over time. This would in turn lead to inaccurate inventory estimates and also result in poor recommendations in order amounts based on such estimates of current inventory levels. One way to reduce such error would be to ask a user to review the inventory. However, this leads to a second problem with existing perpetual inventory models, which is in handling measurement noise. For example, existing perpetual inventory estimation techniques will reset or anchor to user measurements, treating them as if they were ground truth and completely correct.

However, user measurements are based on human behavior, which is prone to noise (e.g., errors and inaccuracies). For example, there is a noise distribution to the inventory observations that humans provide as input. When an existing perpetual inventory model resets to these noisy user measurements/observations, this leads to bias or inaccuracy in the inventory estimates.

As described above, and as will be shown in further detail below, embodiments of the probabilistic inventory estimation techniques described herein are robust to user measurement error, and also account for perishability. Further, the probabilistic inventory estimation techniques described herein generate probabilistic distributions (from which an estimate of the current inventory is drawn or otherwise determined), where the determination of a probabilistic distribution provides the ability to quantify uncertainty in the estimates being made. Being able to quantify such uncertainty is beneficial, as it can be used to provide a confidence in the estimates of current inventory that are being outputted. For example, as will be described in further detail below, if the confidence is low, then user interaction can be requested. The ability to determine uncertainty bounds is an improvement over existing inventory estimation techniques that do not generate probabilistic estimates.

Improved Perishable Inventory Accuracy

Figure 4:
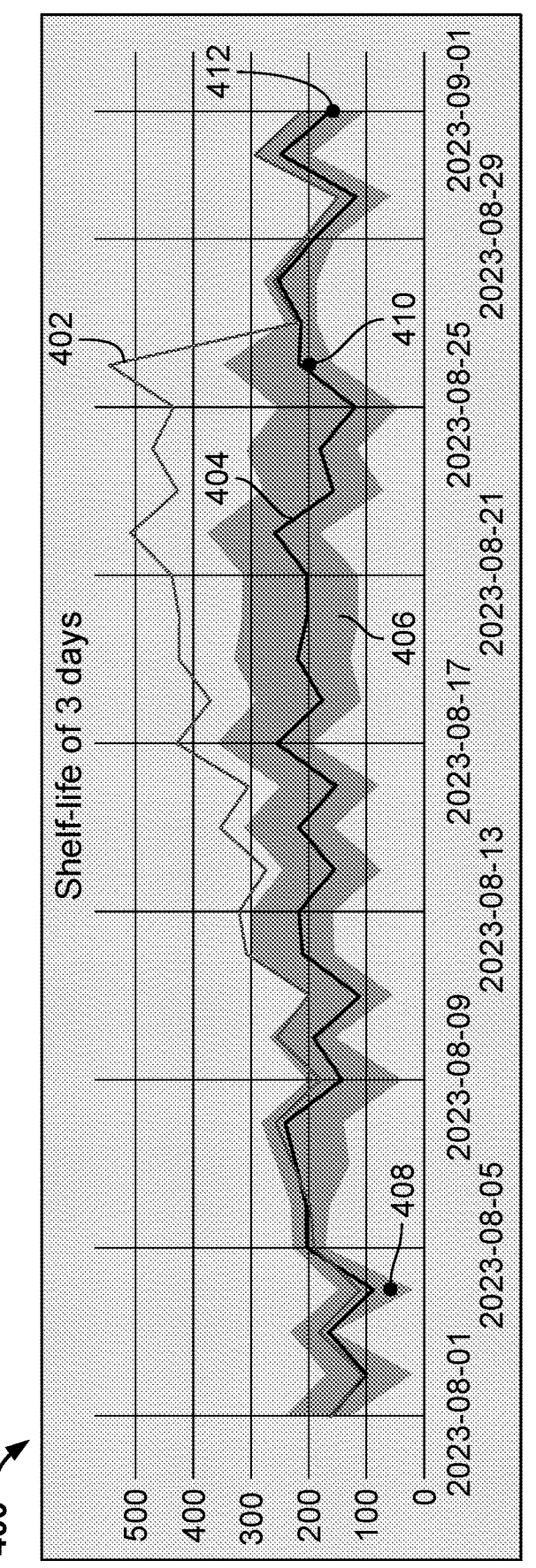
FIG. 4 illustrates a plot of probabilistic inventory estimation.

FIG. 4 illustrates a plot of probabilistic inventory estimation. In this example, the improvements in inventory estimation by modeling perishability are shown. In the example of plot 400, suppose a perishable item with a shelf-life of approximately three days. In this example, an existing inventory model (e.g., perpetual inventory model) 402 will continue to ramp up and increase its inventory estimate because it does not take into account shrink. In contrast, using the inventory HMM described herein, as shown at 404, generated inventory estimates are much closer to user inventory observations (408, 410, 412).

Further, as described above, using the probabilistic inventory estimation techniques described herein, confidence bands or uncertainty bounds are also determined for the probabilistic inventory estimate (inferred, for example, using the particle filtering described above). For example, the confidence band for the inventory HMM is shown at 406, and, while slightly increasing over time, does not do so by much.

Referring again to the example of FIG. 4, in this example, there are only a sparse number of inventory observations, on August $4^{th}$ (408), August $26^{th}$ (410), and September $1^{st}$ (412). In this example, there is a wide distance between the two observations 408 and 410, despite the item being highly perishable, where there is a large amount or period of time for shrink to occur between the two inventory measurements/observations. As shown in this example, because of the reliance of existing inventory estimation models on user observations and a lack of accounting or consideration of an item's perishability, the perpetual inventory estimate continues to grow over time (from Augst $4^{th}$, until the estimate snaps back to the appropriate level at the next observation at August $25^{th}$ (where in this example the user observation is assumed to be correct)). This will result in more of the item being ordered than is actually sold, due to not accounting for food waste in the perpetual inventory model.

In contrast, using the probabilistic estimation techniques described herein, the estimate continues to be appropriately calibrated, because there is an estimate of the shelf life that is factored into the overall inventory estimation.

Robustness to User Measurement Noise

As described above, using the techniques described herein, the probabilistic inventory estimation is also robust to noise in user inventory measurements. In some embodiments, the techniques described herein for handling noisy user inventory measurements are applicable to non-perishable items as well. That is, the robustness of the inventory HMM described herein is beneficial for non-perishable goods as well.

Figure 5:
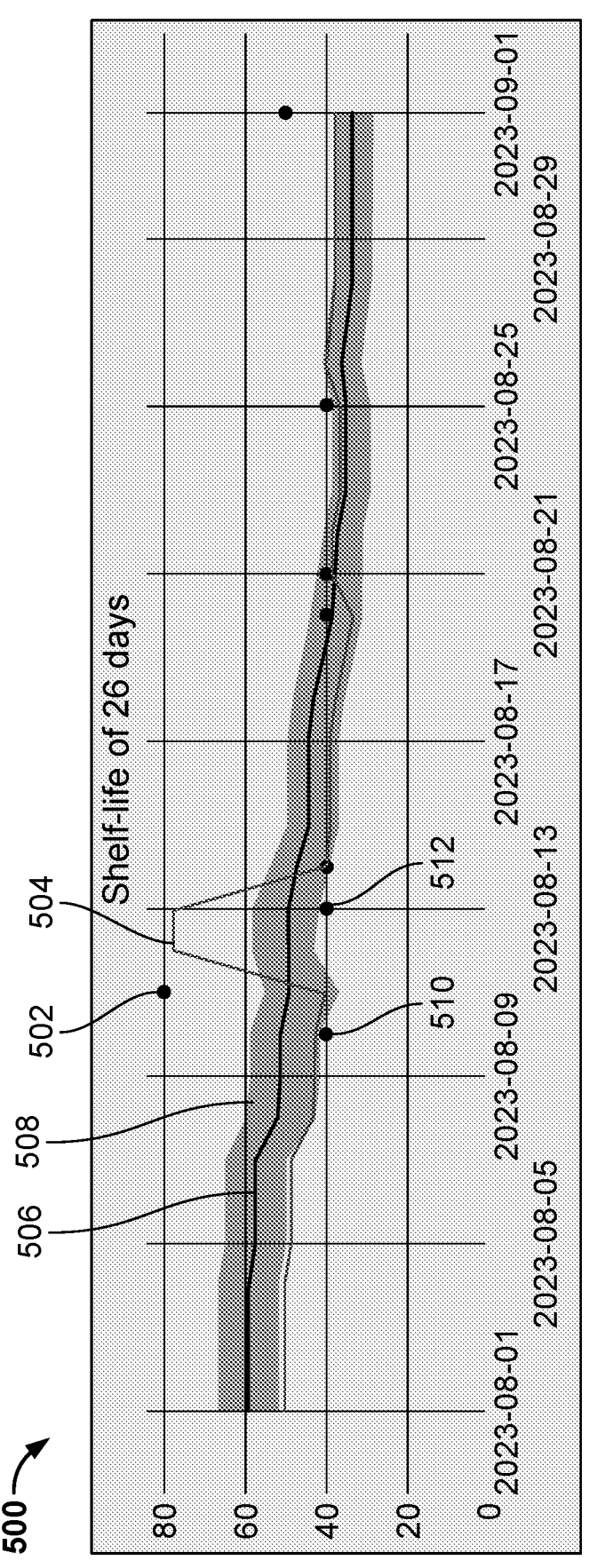
FIG. 5 illustrates a plot of probabilistic inventory estimation.

FIG. 5 illustrates a plot of probabilistic inventory estimation. In the example plot 500 of FIG. 5, an item with a high shelf-life of over 20 days is shown. Plotted on the Y-axis are inventory levels. Plotted on the X-axis is time. Line 506 is the inventory level predicted using the probabilistic inventory estimation techniques described herein. The shaded portion 508 about line 506 is an area indicating a confidence interval associated with the probabilistic inventory estimate. Points 502, 510, 512, etc. are examples of inventory measurements taken by a person, such as a produce manager in a store, In this example, an erroneous or noisy user measurement is shown at 502. For example, from the sequence of user inventory measurements, it can be observed that user input 502 is an outlier that is inaccurate. Because existing inventory estimation models such as perpetual inventory models treat user observations as ground truth, and thus reset or snap their estimates to the user observations, as shown at 504, the perpetual inventory model will generate a highly inaccurate inventory estimate at the corresponding time that is almost 40 units off what is possible for the inventory. Further, the estimate will continue to be highly erroneous until a next correct user observation is received (e.g., the perpetual inventory model snaps to or follows this incorrect user measurement value and continues with its modeling based on the rogue value).

In contrast, as shown in the example FIG. 5, the inventory estimate generated by the inventory HMM (line 506, with confidence bounds 508) treats user observations as a noisy process, and is not perturbed by the outlier user observation, illustrating the robustness of the inventory HMM to noise user inventory input.

As shown in this example, the perpetual inventory model snaps to the user inventory measurements (e.g., assumes that the user inventory measurement is a correct, ground truth value in its output) without the weighting described herein.

As shown in this example, the probabilistic inventory estimation is unperturbed by the rogue observation at 502. As shown in this example, the probabilistic inventory estimation model continues to be unperturbed by further noisy user observations that are inconsistent with each other. The example of FIG. 5 illustrates the robustness of the probabilistic inventory estimation model described herein. In this example, via the weighting described herein, the influence or impact of noisy observations on the probabilistic inventory estimates is minimized. For example, the probabilistic inventory estimation model does not snap to user observations (even if inaccurate) in the manner that existing perpetual inventory estimation models do.

The treatment of user inventory observations as a noisy process is beneficial for estimating inventory for both perishable and non-perishable items. For example, if a user inventory observation is received on a given day, regardless of whether there is any perishability or not, using the weighted resampling techniques described herein, the inventory estimates are adjusted to take the user inventory observations into account in a manner that is robust to inaccurate measurements.

As shown in the example of FIG. 5, and as described above, the probabilistic inventory estimation techniques described herein are robust to noise or errors or inaccuracies in user inventory observations or records because the inventory estimate does not simply reset or snap to the user inventory measurements (as is the case with an existing perpetual inventory model). Rather, as described above, the user measurements are treated as having a distribution and being noisy, and are used to perform resampling of particles when estimating or inferring the probability distribution for the inventory as a point in time.

In addition to providing improved inventory estimates that are both accurate for perishable items, as well as robust to user measurement noise, the use of such a probabilistic model of inventory and such particle filtering is also efficient with respect to the use of computer resources. For example, using the probabilistic estimation techniques described herein, inference of large numbers of store items can be performed in a short amount of time (e.g., inference of millions of store items in less than one hour). The efficiency of the probabilistic estimation techniques described herein can be even further improved or increased by exploiting graphical processing units (GPUs).

Example Outputs Based on Probabilistic Inventory Estimation

The following are examples of outputs that are supported by the probabilistic inventory estimation described herein.

In some embodiments, based on the determined probabilistic distribution of the inventory of an item for a target step (time), a best estimate of the amount of inventory of the item is provided as output. As one example of determining the optimal estimate, the median inventory level or mean (average) inventory level is used or selected as the optimal estimate. In some embodiments, a recommended amount of an item to order is provided as output based on the probabilistic estimate of inventory level. For example, a recommendation is made based on the amount of inventory remaining, the expected amount of sales, the expiration date of the remaining inventory, the time for shipment, etc. As one example, a target inventory is determined. The current inventory (estimated using the inventory HMM, as described above) is subtracted from the target inventory to determine a recommended or optimal order amount. As one example, a target inventory is determined by a decision-making algorithm that takes as input forecasted demand as well as estimates of shelf life (learned, for example, via machine learning), and produces as output a target or optimal amount of inventory to have to maximize sales and minimize how much food is being thrown out. This yields dual benefits of maximizing sales and reducing food waste.

Figure 6:
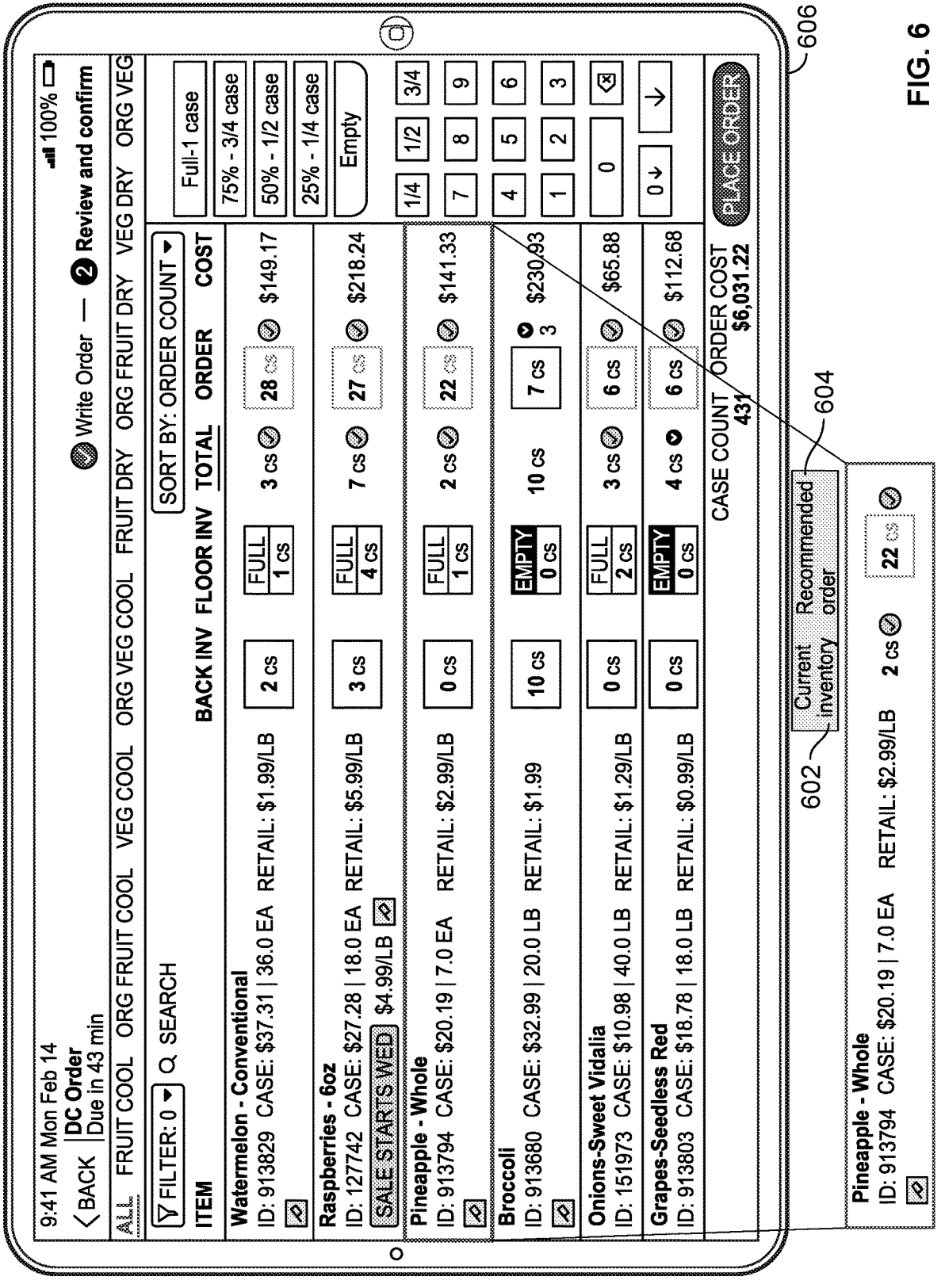
FIG. 6 illustrates an embodiment of an interface for item ordering.

FIG. 6 illustrates an embodiment of an interface for item ordering. In the example of FIG. 6, the estimate of current inventory for an item, whole pineapples, is shown at 602. At 604, a recommended order amount is shown. In this example, device 606 is an example of device 102 of FIG. 1.

As another example of using the probabilistic distribution determined as described herein, assessing of user inventory observations is performed. For example, suppose that a produce manager takes a manual measurement of inventory and provides the observed value to the platform. In some embodiments, the platform compares the entered user measurement value against the probabilistic distribution generated for the item. If the user measurement is inconsistent with the distribution (e.g., that the user entered value is far outside the bounds of the distribution), then the platform sends a notification indicating the discrepancy, and flags the user to check whether they have taken inventory correctly. For example, the confidence bounds are determined using uncertainty quantification engine 120, and the flagging is performed by alerting engine 122 of FIG. 1.

Targeted Inventory Data Request

In some embodiments, platform 110 is configured to provide an alert (e.g., via alerting engine 122) indicating that manual inventory should be taken of a particular item.

One example way to request such targeted inventory taking is based on a heuristic regarding how the error with respect to inventory grows over time. For example, suppose an item with a low shelf life. For such an item, the uncertainty in inventory for such an item may grow faster than for an item that is non-perishable. As one example, this rate of uncertainty is configured to be inversely proportional to shelf life. In one embodiment, this uncertainty rate is multiplied by the number of days it has been since a manual inventory observation was taken for that item. This error value that is determined as the uncertainty rate (which is inversely proportional to shelf life for an item), multiplied by the number of days since the last manual inventory measurement, is determined for each item to be tracked. In some embodiments, the items are prioritized by their corresponding or respective error values. As one example, the item with the highest error is prioritized as the next item for which a request for targeted inventory taking is made.

The following is an embodiment of targeted inventory requesting using the probabilistic inventory estimation described herein. As described above, by producing probabilistic estimates, embodiments of the inventory estimation system are also capable of quantifying the uncertainty of the inventory estimates it produces (e.g., by determining calibrated confidence bounds). The quantification of such uncertainty in inventory estimates further facilitates targeted requesting of inventory-taking.

For example, rather than tasking a person to take inventory of every item, or some items selected arbitrarily, the system makes requests for human inventory-taking that target specific items whose inventory estimates made by the model have greater uncertainty. For example, the system is able to determine which specific items to request new human inventory data on. As one example, a notification can be sent to take manual inventory for a specific item if it is determined that the confidence interval for the inventory estimate for that item is wide (an example indication of greater uncertainty).

The following are embodiments of targeted requesting of user inventory measurements for a specific item using the probabilistic inventory estimation described herein.

In some embodiments, whether an inventory-taking request is made is based on the uncertainty in the estimate of the inventory. As one example, the uncertainty is determined by evaluating the particles that were simulated and determining the distance between the minimum and maximum values in the distribution of the particle samples.

The notification can be targeted based on this uncertainty measured from the estimated distribution. For example, inventory monitoring can be flagged for items that have a certain amount of uncertainty in their estimate. What items should be monitored can also be prioritized based on the corresponding amount of uncertainty in the estimated inventory. Monitoring of items can also be prioritized based on an amount of impact that uncertainty will have on ordering of the items. For example, for an item, the recommended amount to order if using an inventory value on the higher end of the distribution is compared to the recommended amount to order if using an inventory estimated value at the lower end of the distribution. If the error propagates to a large difference in the recommendation, such as in the number of cases of an item that would be ordered, or the value of the cost of the order (e.g., beyond a threshold cost or order shipment size), then the item is flagged for user monitoring. Items can also be prioritized for monitoring based on the spread in the amounts ordered (or values of amounts ordered).

Historical Inventory Estimation Using Future Data Relative to a Target Date

In some embodiments, the probabilistic inventory estimation model moves forward in time, where the inventory estimated for today (or any other target date, as appropriate) is based on all of the inventory data preceding the target date in time.

In some embodiments, the probabilistic model is configured to estimate the inventory on a given day (in the past), not just based on the previous inventory data, but also the future information (relative to that date). This allows an entity such as a grocery store to estimate historical inventory levels over a time period, such as the last year. In this case, for estimating the inventory for a target date in the past, both the inventory information prior and after the target date can be utilized to make the estimation of inventory levels for the item for the target date. This improves the accuracy of the inventory estimation due to shrink.

As described above, in a forward pass, for each day that is simulated, a distribution of inventory is generated. The distribution for one day will depend on the distribution of the previous day (modeling the change in inventory from one day to the next). In some embodiments, when performing historical probabilistic inventory estimation, a recursion is performed where the distributions determined during the forward pass of the modeling are adjusted (e.g., by multiplying by a factor or some other weight) in a backwards step based on information that is relatively in the future.

This results in a distribution for a given day that is adapted based on both forward passes (using information that is relatively in the past in time) and backward passes of the model (using data that is relatively ahead in time). For example, the distribution of inventory estimated for day t, is not only determined based on the distribution of day t−1, but is also adapted based on the distribution determined for day t+1.

In some embodiments, for a particle associated with a step or point in time, a probabilistic distribution of the values that the particle can take on and their probabilities are determined that is conditioned on all of the data (e.g., shipment data, sales data, user inventory observations, etc.) that is available to the model.

Inventory Estimation for Different Types of Items

In some embodiments, different probabilistic inventory estimation models are configured for different items. In other embodiments, the same probabilistic inventory estimation model is used for different items. For example, the parameters of the model are adjusted or changed for different items. For example, suppose that bananas come in cases of 100 bananas. Suppose that a different item, such as Kombucha, comes in cases of 6 bottles. In some embodiments, the different items are associated with different expiration dates, as well as different shrink fractions. The same model is then used, but with different shrink fractions and expiration dates for different items as parameter values. As described above, the shrink fraction can be determined based on evaluation of the ratio of historical shipments to sales. As another example, different items are associated with corresponding different error profiles. The bananas, with 100 per case, will have larger errors on an absolute scale.

Loading the model with different parameter values allows the model to be adaptable for different items.

Figure 7:
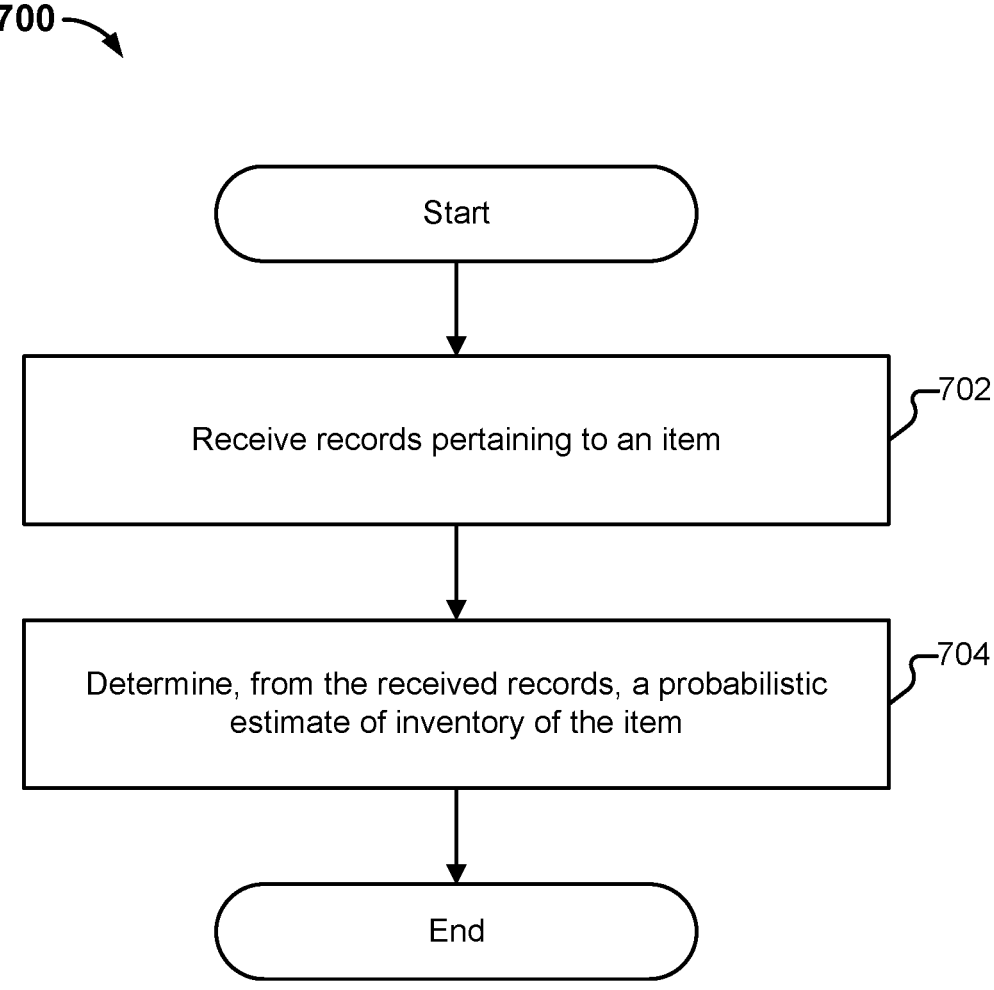
FIG. 7 is a flow diagram illustrating an embodiment of a process for probabilistic inventory estimation.

FIG. 7 is a flow diagram illustrating an embodiment of a process for probabilistic inventory estimation. In some embodiment, process 700 is executed by platform 110 of FIG. 1. The process begins at 702 when records pertaining to an item are received. At 704, based on the received records, a probabilistic estimate of inventory of the item is determined. Examples of records received at 702 include shipment data, transaction data (e.g., sales data), and user inventory observations. At 704, a probabilistic estimate of the inventory for the item is determined based on the shipment data, sales data, and user inventory observations.

In some embodiments, the probabilistic inventory estimate is a probabilistic estimate of the inventory for the item as of a target time, such as the current day. Probabilistic inventory estimates can also be generated for temporal points in time in the past.

As one example, the probabilistic inventory estimate is determined from a probability distribution. The probability distribution includes a range of possible values that the inventory level can take on, with each possible inventory level value associated with a corresponding probability or likelihood. In some embodiments, determining the probabilistic inventory estimate includes quantifying uncertainty of the estimate. In some embodiments, uncertainty quantification includes providing calibrated confidence bounds on the probabilistic inventory estimate.

In some embodiments, the probabilistic inventory estimate is determined using a model, such as by modeling the state of the inventory level using a hidden Markov model. In some embodiments, if the item is a perishable item, in addition to being based on shipment data, sales data, and user inventory observations, the probabilistic inventory estimate is determined based on estimating the shelf life of the item of interest. For example, for each shipment in the shipment records for the item, an expiration date is determined that is based on a shelf-life estimate. In some embodiments, a shrink fraction, as described above, is also determined.

In some embodiments, the probabilistic characteristics of the inventory level (e.g., probability distribution, selected inventory estimate value, etc., as described above) are determined via inference. One example of performing such inference includes performing particle filtering as described above. For example, performing particle filtering includes running multiple simulations in which multiple inventory level trajectories over time are simulated. A probability distribution of the inventory level as of the target time is then determined from the simulations. For example, multiple trajectories are simulated in which different expiration dates for shipments are simulated (e.g., determined by simulating different predicted shelf-life estimates).

In some embodiments, the user inventory observations are used to perform resampling of particles. In some embodiments, taking into account the user inventory observations includes modeling the user inventory observations as a noisy process or as having a probability distribution. In some embodiments, weighted particle resampling is performed based on the modeling of the user inventory observations.

Various types of output are supported by the probabilistic inventory estimate. As one example, the probabilistic inventory estimate is used to determine an amount of the item to order. As another example, the probabilistic inventory estimate is used to verify or check or validate a user inventory observation (e.g., by determining whether the user inventory observation is an outlier based on the probability distribution of inventory that is estimated). As another example, targeted requesting of inventory measurement-taking of specific items is facilitated, as described above, based on the probabilistic inventory estimation described herein.

Described herein are embodiments of probabilistic inventory estimation. Using the probabilistic inventory estimation techniques described herein, perishability of items is taken into account, providing improved perishable inventory accuracy. This is in contrast to existing inventory estimation models that do not model perishability. Further, the probabilistic inventory estimation techniques provide accurate inventory estimates while being robust to noise in user input observations. This is an improvement over existing inventory models that are sensitive to user measurement error. Further, using the probabilistic inventory estimation techniques described herein, uncertainty in the inventory estimates can be quantified, such as providing calibrated confidence bounds. This is an improvement over existing inventory estimation models that do not provide any uncertainty in their estimates.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A probabilistic inventory estimation system, comprising:

one or more processors configured to:

receive a set of records pertaining to a perishable item, comprising:

shipment data pertaining to the perishable item;

transaction data pertaining to the perishable item; and at least one user inventory observation pertaining to the perishable item;

determine a probabilistic estimate of inventory of the perishable item based at least in part on the shipment data, the transaction data, and the at least one user inventory observation pertaining to the perishable item, wherein determining the probabilistic estimate of inventory of the perishable item comprises simulating inventory trajectories of the perishable item over time at least in part by sampling shelf-life estimates of the perishable item; and recommend an amount of the perishable item to order based at least in part on the probabilistic estimate of inventory of the perishable item; and a memory coupled to the one or more processors and configured to provide the one or more processors with instructions.

2. The probabilistic inventory estimation system of claim 1, wherein determining the probabilistic estimate of inventory of the perishable item comprises determining uncertainty associated with the probabilistic estimate of inventory of the perishable item.

3. The probabilistic inventory estimation system of claim 1, wherein the probabilistic estimate of inventory of the perishable item is determined at least in part by performing particle filtering.

4. The probabilistic inventory estimation system of claim 3, wherein performing the particle filtering includes performing resampling based on the at least one user inventory observation.

5. The probabilistic inventory estimation system of claim 4, wherein performing the resampling includes upweighting or down-weighting a particle based at least in part on the at least one user inventory observation.

6. The probabilistic inventory estimation system of claim 1, wherein an expiration date of a shipment is determined based at least in part on a sampled shelf-life estimate of the perishable item.

7. The probabilistic inventory estimation system of claim 6, wherein the probabilistic estimate of inventory of the perishable item is determined at least in part by using the expiration date of the shipment determined based at least in part on the sampled shelf-life estimate of the perishable item and a shrink fraction associated with the shipment.

8. A method, comprising:

receiving a set of records pertaining to a perishable item, comprising:

shipment data pertaining to the perishable item;

transaction data pertaining to the perishable item; and at least one user inventory observation pertaining to the perishable item;

determining a probabilistic estimate of inventory of the perishable item based at least in part on the shipment data, the transaction data, and the at least one user inventory observation pertaining to the perishable item, wherein determining the probabilistic estimate of inventory of the perishable item comprises simulating inventory trajectories of the perishable item over time at least in part by sampling shelf-life estimates of the perishable item; and recommending an amount of the perishable item to order based at least in part on the probabilistic estimate of inventory of the perishable item.

9. The method of claim 8, wherein determining the probabilistic estimate of inventory of the perishable item comprises determining uncertainty associated with the probabilistic estimate of inventory of the perishable item.

10. The method of claim 8, wherein the probabilistic estimate of inventory of the perishable item is determined at least in part by performing particle filtering.

11. The method of claim 10, wherein performing the particle filtering includes performing resampling based on the at least one user inventory observation.

12. The method of claim 11, wherein performing the resampling includes upweighting or down-weighting a particle based at least in part on the at least one user inventory observation.

13. The method of claim 8, wherein an expiration date of a shipment is determined based at least in part on a sampled shelf-life estimate of the perishable item.

14. The method of claim 13, wherein the probabilistic estimate of inventory of the perishable item is determined at least in part by using the expiration date of the shipment determined based at least in part on the sampled shelf-life estimate of the perishable item and a shrink fraction associated with the shipment.

15. A computer program product embodied in a non-transitory computer readable storage medium and comprising computer instructions for:

receiving a set of records pertaining to a perishable item, comprising:

shipment data pertaining to the perishable item;

transaction data pertaining to the perishable item; and at least one user inventory observation pertaining to the perishable item;

determining a probabilistic estimate of inventory of the perishable item based at least in part on the shipment data, the transaction data, and the at least one user inventory observation pertaining to the perishable item, wherein determining the probabilistic estimate of inventory of the perishable item comprises simulating inventory trajectories of the perishable item over time at least in part by sampling shelf-life estimates of the perishable item; and recommending an amount of the perishable item to order based at least in part on the probabilistic estimate of inventory of the perishable item.

* * * * *